United States Patent Office 2,702,350
Patented Feb. 15, 1955

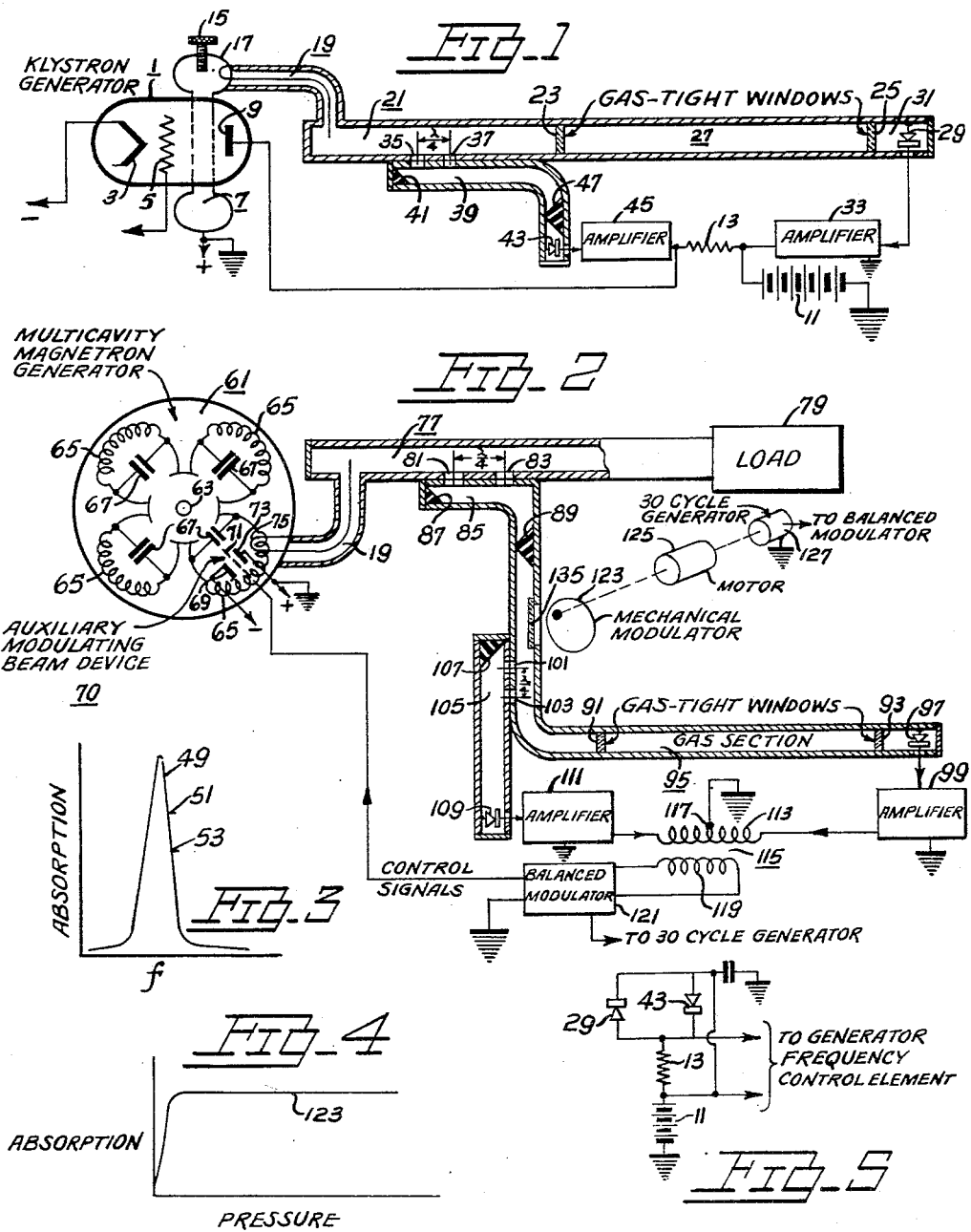

2,702,350

FREQUENCY STABILIZATION OF OSCILLATORS

William D. Hershberger, Princeton, N. J., assignor to Radio Corporation of America, a corporation of Delaware Application November 18, 1947, Serial No. 786,736

5 Claims. (Cl. 250—36)

This invention relates generally to the frequency stabilization of microwave oscillations and more particularly to methods of and means for stabilizing microwave frequencies by utilizing the discrete microwave frequency absorption spectra of certain microwave absorptive gases.

Heretofore, many methods and systems have been proposed and utilized for stabilizing the frequency of microwave generators by regulation of operating potentials, by load regulation, or by reactance control systems. While piezocrystals are satisfactory as frequency control elements at low and medium radio frequencies, they are not readily applicable to control of microwave frequencies. It is essential for satisfactory microwave frequency control to stabilize the generated frequency by some substantially fixed frequency phenomena or device operative in the same general microwave frequency spectrum.

Microwave absorption spectra in certain gases such, for example, as ammonia, carbonyl sulphides and methyl halides may be either resonant or non-resonant. Non-resonant absorption at a fixed microwave frequency increases with the square of the gas pressure, and thus becomes negligible as the pressure is decreased to low valves.

All microwave resonant absorptive gases exhibit a plurality of microwave resonant absorption lines or spectra of distinctive and different frequency distribution for each gas. The frequency of each of these resonant absorptive spectral lines is a fixed value which is independent of temperature, pressure, and of the physical characteristics and proportions of the gas chamber. The only known method of shifting the frequency of such spectral lines is by application of a relatively strong unidirectional magnetic or electrostatic field. Therefore, applicant proposes to utilize the inherent frequency stability of such spectral lines to stabilize the frequency of a microwave generator. The term "molecular resonance" as employed herein defines the characteristics or properties of an aggregation of gas molecules which give rise to the selective absorption of electromagnetic microwaves of a definite frequency or frequencies.

Resonant absorption at one of the microwave resonant absorption frequencies of a particular absorptive gas remains constant as the gas pressure is decreased, providing that the observations are taken at the exact center frequency of the absorption line. Resonant absorption is noted in carbonyl sulphide and ammonia while non-resonant absorption is observed in the methyl halides. Materials such as ethylamine or methylamine exhibits both resonant and non-resonant absorption and the two kinds of absorption may be distinguished in particular by their pressure dependence.

For carbonyl sulphide, for example, the absorption at a microwave resonance line may be expressed by $$\alpha = \frac{\mu_0^2 V_0^2 (J+1) h}{3cI(kT)^2} \frac{N}{\Delta v}$$

where $\mu_0$ is the dipole moment of the gas, $V_0$ is one of the resonant absorption frequencies, $J$ is the quantum number, $h$ is Planck's constant, $c$ is the velocity of light, $I$ is the moment of inertia, $k$ is Boltzmann's constant, $T$ is the absolute temperature, $N$ is the number of molecules per cubic cm. and $\Delta v$ is the width of the absoprtion line at half absorption values in cycles per second. $N$ varies linearly with pressure as does $\Delta v$ until, at very low gas pressure, factors other than collisions between gas molecules enter into the equation to determine line width. Thus the absorption at microwave frequencies of such gases plotted against pressure rises sharply with pressure over the low pressure range and then becomes asymptotic to some limiting value as the pressure is further increased. The effect of an increase in gas pressure for resonant absorption is to increase the frequency width of the gas absorption line without varying its magnitude at the center frequency.

The instant invention utilizes the extremely narrow frequency absorption spectra at reduced pressures in certain of the microwave absorptive gases to stabilize the frequency of a microwave generator such, for example, as a klystron or magnetron microwave oscillator. At $10^{-2}$ to $10^{-3}$ mm. of mercury pressure, the effective Q (ratio of line frequency to line width) of a spectral line in such gases is of the order of 50,000 to 100,000, irrespective of the particular resonant absorptive gas employed.

In one embodiment of the instant invention, the fact that the frequency of a klystron microwave generator is controlled in part by the voltage applied to the reflector electrode thereof is utilized to effect frequency control. In such a system, the frequency selective microwave absorption in a gas chamber is utilized to control a frequency control voltage applied to the klystron reflector electrode in order to maintain the reflector voltage at a constant value and thus to stabilize the generated frequency. Variations in microwave resonant gas absorption are detected and compared with the generated signals whereby the resultant control voltage degeneratively controls the generated signal frequency.

In a second embodiment of the invention, the fact that the frequency of a magnetron generator may be controlled by an auxiliary electron beam projected through one of the magnetron resonant cavities is utilized. In the latter embodiment of the invention, the frequency selective microwave absorption in a microwave absorptive gas chamber is utilized to control the magnitude of the auxiliary frequency controlling electron beam in one or more of the magnetron cavity resonators and thus to stabilize the magnetron operating frequency.

Among the objects of the invention are to provide novel methods of and means for stabilizing microwave frequencies. Another object is to provide methods of and means for stabilizing the frequency of a microwave generator in response to frequency selective microwave absorption in gases exhibiting this characteristic. An additional object is to provide methods of and means for stabilizing the frequency of a klystron or reflex type microwave generator in response to microwave gas absorption spectra of gases having this characteristic. Another object is to provide methods of and means for stabilizing the frequency of magnetron microwave generators in response to frequency selective microwave absorption in gases having this characteristic. An additional object of the invention is to provide methods of and means for stabilizing the frequency of microwave generators by exciting at the operating microwave frequency any of certain microwave absorptive gases to provide molecular resonant microwave absorption therein and by stabilizing the frequency of said generator in response to said resonant microwave gaseous absorption.

The invention will be described in greater detail by reference to the accompanying drawing of which Figure 1 is a schematic diagram of a first embodiment thereof as applied to the frequency control of a klystron or reflex type microwave generator, Figure 2 is a schematic diagram of a second embodiment of the invention as applied to the frequency control of a magnetron type microwave generator, Figure 3 is a graph illustrating the relation between microwave frequency and microwave energy absorption in a microwave absorptive gas, Figure 4 is a graph illustrating the relation between pressure and microwave absorption in such a gas, and Figure 5 is a fragmentary circuit diagram of a modification of the schematic diagrams of Figure 1 or 2. Similar reference characters are applied to similar elements through the drawing.

A first embodiment of the invention, adapted to stabilizing the frequency of a klystron or reflex type microwave generator, is illustrated in Figure 1 of the drawing. The microwave generator 1 includes a cathode 3, a control grid 5, a centrally apertured reentrant cavity resonator 7 and a reflector electrode 9. The cavity resonator 7 is positively biased with respect to the cathode 3, and a beam intensity control bias potential is applied to the control electrode 5. The reflector electrode 9 is negatively biased with respect to the cavity resonator 7 by means of a battery 11 connected to the reflector electrode 9 through a resistor 13. Conventional klystron generator tubes include a tuning element 15 for tuning the cavity resonator 7. An output coupling loop 17 extending into the cavity resonator 7 couples microwave energy generated by the klystron through a coaxial line 19 to a waveguide 21.

A portion of the waveguide 21, closed off by gas-tight microwave permeable windows 23, 25 comprises a gas chamber section 27 filled with a microwave-absorptive gas such as ammonia. A first crystal detector 29 is enclosed within a third section 31 of the waveguide, and is responsive to microwave energy transmitted through the gas chamber section 27. The detector 29 should be substantially matched to the characteristic impedance of the waveguide system and is connected to the input circuit of a D.-C. amplifier 33, the output circuit of which is connected to the resistor 13.

The waveguide 21 also is coupled through a pair of apertures 35, 37, spaced one-quarter wavelength apart at the operating frequency, to a directional coupler waveguide 39 which, for example, may be of the type described in the Proceedings of the Institute of Radio Engineers, February 1947 at pages 160–165. A matched terminating unit 41 such as a lossy dielectric wedge is enclosed within the generator end of the directional coupler waveguide 39. A second microwave detector 43 is enclosed within the opposite end of the directional coupler waveguide and is connected to the input circuit of a second D.-C. amplifier 45. If desired, an attenuating dielectric wedge 47 may be inserted between the coupling aperture 37 and the second microwave detector 43 to prevent wave reflections from said detector from entering the waveguide 21. The output of the second amplifier 45 is connected to the remaining end of the resistor 13 and to the reflector electrode 9 of the klystron generator 1. A load circuit, not shown, may be coupled to the generator in any manner known in the art providing load circuit energy variations do not disturb the detector circuit balanced condition.

In operation the detected microwave signals derived from the crystal detectors are equalized by adjusting the microwave coupling to the detectors or by adjusting the gain of the respective detector amplifiers when the microwave generator 1 is adjusted to an operating frequency close to a resonant absorption center frequency of the microwave absorptive gas in the gas-tight chamber 27. The microwave losses in the gas vary rapidly with frequency in the region of maximum microwave absorption in the gas so that the differential output of the detector amplifiers 33, 45 varies rapidly as a function of the microwave operating frequency. The differential output voltage thus applied to the reflector electrode 9 of the klystron generator is employed to regulate the reflector voltage and thus to stabilize the frequency of the generator. It is well known in the art that the operating frequency of a klystron generator is primarily determined by the voltage applied to the reflector electrode which determines the transit times of the electrons in the tube.

It should be understood that the amplifiers 33, 45 are not essential to the operation of the system but that they permit greater flexibility in circuit adjustment and provide greater sensitivity in frequency control since the gain of the control circuits determines the accuracy within which the reflector voltage varies as a function of frequency. It should be understood that the operating frequency of the klystron generator should be adjusted so that it corresponds with a frequency slightly lower or slightly higher than the frequency providing maximum microwave absorption in the microwave absorptive gas, depending upon the relative polarities of the microwave detectors 29 and 43. This condition is essential in order that the frequency control circuit of the system may operate in proper sense to control the reflector voltage degeneratively as a function of frequency variations of the microwave generator. A typical microwave gas absorption resonance line is illustrated in Figure 3 wherein microwave gas absorption is plotted in terms of the frequency of microwave signals irradiating a microwave absorptive gas. Such gases have a plurality of microwave absorption resonant frequencies, as explained heretofore, and any one of the resonant absorption lines may be selected for control. The frequency control range of the device is represented by the portion of the graph 49 between the points 51 and 53 of the low frequency side of the resonance curve. It should be understood that operation on one side of the resonance curve will degeneratively control the reflector voltage as a function of the operating frequency while operation on the other side of the microwave resonance curve will regeneratively vary the voltage as a function of frequency. Such regenerative variation of reflector voltage would not provide frequency stabilization in the instant system.

Figure 2 illustrates a second embodiment of the invention adapted to the stabilization of the generated frequency of a multiple cavity magnetron type microwave generator 61. Such magnetron generators are well known in the art and include a center cathode 63 surrounded by a plurality of radially disposed cavity resonators each represented schematically by inductors 65 and capacitances 67. A unidirectional magnetic field of high intensity is applied to the magnetron generator in a direction perpendicular to the plane of the drawing. It is known that such magnetron microwave generators may be varied in operating frequency by an auxiliary electron beam device coupled into one or more of the cavity resonators whereby an electron beam projected through the resonator or resonators has a reactive effect on the resonator tuning. Such an auxiliary modulating beam device 70 is represented schematically by an auxiliary cathode 69, control grid 71, and anode 73 enclosed within one of the magnetron cavity resonators. The anode and cathode of the auxiliary beam device are supplied with operating potentials to project the desired intensity of microwave beam through the cavity resonator. Control voltages or signals applied to the control grid 71 of the auxiliary beam device 70 vary the intensity of the control electron beam, thus varying the reactive effect of said beam upon the magnetron cavity resonator through which it is projected and thus varying the operating microwave frequency of the generator.

An output coupling loop 75, coupled into one of the cavity resonators of the magnetron generator 61, is connected through the coaxial line 19 and coupled into a transmission waveguide 77 which is terminated in a load 79. A pair of apetrures 81, 83 separated by one-quarter wavelength at the operating frequency, couple the transmission waveguide 77 into a first directional coupler waveguide 85, the generator end of which is terminated by a wedge shaped terminating element 87, similar to the device 41 in the circuit of Figure 1. The directional coupler waveguide 85 may include an isolating dielectric wedge 89 to isolate the succeeding portions thereof from the transmission waveguide 77 and from the microwave source. The directional coupler waveguide 85 includes a pair of gas-tight microwave permeable windows 91, 93 forming a gas section 95 enclosing the microwave absorptive gas, and is terminated by a first microwave detector 97 which is coupled to the input circuit of a first A.-C. amplifier 99. The first directional coupler waveguide 85 is also coupled through a second pair of coupling apertures 101, 103, spaced one-quarter wavelength at the operating microwave frequency, into a second directional coupler waveguide 105, the generator end of which is terminated by a second matched terminated dielectric wedge 107. The remote end of the second directional waveguide 105 is terminated by a second microwave detector 109 which is connected to the input of a second A.-C. amplifier 111.

The output circuits of the amplifiers 99 and 111 are connected to a balanced output circuit comprising, for example, the primary winding 113 of an output transformer 115. The center tap 117 of the primary winding 113 of the output transformer is effectively grounded. The secondary winding 119 of the output transformer is coupled to the input of a balanced modulator 121. Control signals derived from the balanced modulator 121 are applied to the control grid 71 of the auxiliary modulating beam device of the magnetron generator.

In order that the balanced modulator may be keyed at a low modulation frequency, any conventional modulating system may be connected, for example, to the first directional coupler waveguide 85 to modulate simultaneously the microwave signals coupled into the gas section 95 and into the second directional coupler waveguide 105. For example, a mechanical modulator such as an eccentric rotary device 123, driven by a motor 125, may be coupled into the first directional coupler waveguide 85 through a window 135 to vary the attenuation through the waveguide or other microwave transmission characteristics thereof. It should be understood that any type of mechanical or electrical modulation device known in the art may be employed to provide such low frequency modulation of the microwave signals coupled into the gas section and into the second directional waveguide system. The motor 125 also synchronously drives a low frequency keying generator 127 which is connected to the balanced modulator 121 in the same general manner as described in Review of Scientific Instruments, volume 17, No. 7, pages 268–275. Thus the balanced modulator is effectively keyed at the 30 cycle modulating frequency to provide frequency control signals which depend upon the difference between the magnitudes of the output signals derived from the detector amplifiers 99, 111, and wherein the control signals vary in proper sense with variations in the magnetron output frequency.

In operation, the output signals derived from the microwave detectors 97 and 109 are equalized when the operating microwave frequency is on the desired portion of the microwave gas absorption curve as illustrated in Figure 3. When the frequency is stabilized at the desired value, the signal detected by the balanced modulator is of substantially zero amplitude while a slight variation in operating frequency will unbalance the balanced modulator circuit and provide control signals which are degeneratively applied to control the intensity of the auxiliary modulating beam projected through the magnetron cavity resonator.

It should be understood that microwave absorption in the gas chamber at one of the resonances of the particular microwave absorptive gas employed is a function of the gas pressure as illustrated in the graph 123 of Figure 4. Greatest selectivity and sensitivity of frequency control is obtained with gas pressures of the order of $10^{-3}$ mm. of mercury.

Figure 5 illustrates a modification of the balanced detector circuits of Figures 1 and 2 which may be employed to provide a differential detector output without the necessity of a balanced detector output coupling circuit. In this modification of the invention the microwave detectors 29 and 43 are connected together in opposite polarity so that their output voltages are effectively substracted, and a differential voltage is applied across the resistor 13 to the generator frequency control element, such as to the reflector electrode 9 in the circuit of Figure 1. A similar arrangement could be provided for the circuit of Figure 2 to eliminate the necessity for the balanced output transformer 115 coupling the detector amplifiers 99, 111, to the balanced modulator 121.

In the operation of the microwave detectors 29 and 43, if the signals detected thereby are equal, there is no voltage drop across the resistor 13. If the signal from detector 43 is greater than the signal from detector 29, the resultant control signal becomes more negative, and the frequency of the klystron is increased to compensate for the decrease in frequency which had caused greater energy absorption in the gas and lower output from the detector 29.

It should be understood that the same general arrangement may be utilized to stabilize the frequency of any other type of microwave generator, the frequency of which is controllable by an applied operating control potential. Also, while waveguide transmission and coupling elements have been disclosed herein, it is understood to be within the scope of the instant invention that coaxial line or other microwave coupling circuits may be substituted therefor in accordance with known technique, and that any conventional type of microwave detector may be substituted for the microwave crystal detectors illustrated in the drawing.

Thus the invention disclosed and claimed herein comprises novel methods of and means for stabilizing the frequency of microwave generators as a function of microwave energy absorbed by a microwave resonant absorptive gas, whereby the operating frequency of the microwave generator is a function of the resonant microwave absorptive spectra of the particular gas employed. Various types of control circuits and arrangements are disclosed, and the sensitivity of the control system may be determined by the system gain or by the pressure of the microwave absorptive gas.

I claim as my invention:

1. Apparatus for employing the resonant absorption characteristics of a microwave absorptive gas to stabilize the frequency of a microwave signal source including a microwave signal source of adjustable frequency comprising a microwave magnetron generator having an electron beam frequency modulating element, a waveguide signal transmission system enclosing a fixed volume of said gas at low pressure, means for applying signals from said source through said waveguide system to excite molecular resonance in said confined gas, means coupled into said waveguide for detecting signals transmitted by said gas, second means coupled to said source for detecting said source signals, means for combining said detected signals, means for deriving a control signal from said combined signals, and means for applying said control signal to said frequency modulating element of said source to stabilize the frequency of said source signals.

2. A frequency control system comprising a microwave generator, two paths coupled to said generator for transmission of microwave energy produced by said generator, means for modulating at lower frequency the microwave energies applied to said paths, a chamber in one of said paths containing gas exhibiting molecular resonance at a fixed frequency within the range of said generator, a demodulator responsive to the modulated microwave energy transmitted in the path including said gas chamber, a second demodulator responsive to the modulated microwave energy transmitted in the other of said paths, a network in which the outputs of said demodulators are combined to produce a direct-current signal dependent in sense and value upon said demodulator outputs, and means for applying said direct-current signal to said microwave generator to control the frequency of the microwave energy produced thereby.

3. A frequency control system as in claim 2 in which the network includes a balanced modulator having an input circuit to which the modulating frequency is applied.

4. A method of employing the resonant absorption characteristics of a microwave absorptive gas at a fixed molecular resonance frequency to stabilize the frequency of a microwave signal source comprising applying signals from said source to two transmission paths one of which includes said gas, modulating at lower frequency the amplitude of the signals applied to said paths, detecting the modulated signals respectively transmitted in the paths including said gas and free of said gas, and controlling the frequency of said control signal in accordance with the relative amplitude of the detected modulation of said transmitted signals.

5. Apparatus for employing the resonant absorption characteristics of a microwave absorptive gas at a fixed molecular resonance frequency to stabilize the frequency of a microwave signal source comprising a microwave energy source of adjustable frequency having a frequency control element responsive to applied control signals, a first transmission path for said microwave energy comprising a waveguide system enclosing a fixed volume of said gas at low pressure and exhibiting molecular resonance at a fixed frequency, a second transmission path for said microwave energy, means for modulating at lower frequency the amplitudes of the microwave energies transmitted by said paths, and means for demodulating and combining the demodulation components of the microwave energies transmitted by said paths to provide a control signal applied to said frequency-control element of the microwave source.

No references cited.